US012726827B2

(12) United States Patent
Zhou et al.

(10) Patent No.: US 12,726,827 B2
(45) Date of Patent: Sep. 1, 2026

(54) METHOD FOR EXTERNAL AUTHENTICATION AND AUTHORIZATION

(71) Applicant: ZTE CORPORATION, Shenzhen (CN)

(72) Inventors: Xingyue Zhou, Shenzhen (CN); Shuang Liang, Shenzhen (CN); Menghan Wang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 189 days.

(21) Appl. No.: 18/339,358

(22) Filed: Jun. 22, 2023

(65) Prior Publication Data

US 2023/0413061 A1 Dec. 21, 2023

Related U.S. Application Data

(63) Continuation of application No. PCT/CN2021/071926, filed on Jan. 14, 2021.

(51) Int. Cl.
*H04W 12/73* (2021.01)
*H04W 12/062* (2021.01)

(52) U.S. Cl.
CPC ......... *H04W 12/73* (2021.01); *H04W 12/062* (2021.01)

(58) Field of Classification Search
None
See application file for complete search history.

(56) References Cited

U.S. PATENT DOCUMENTS 10,299,128 B1 * 5/2019 Suthar ................. G06F 9/45558
11,159,933 B2 * 10/2021 Zong ....................... H04W 8/02
11,785,456 B2 * 10/2023 Gundavelli ........... H04W 12/40 726/7
2014/0256291 A1 * 9/2014 Zhou .................. H04L 63/0892 455/411
2019/0246271 A1 8/2019 Torvinen et al.
2023/0146052 A1 * 5/2023 Salkintzis ............. H04W 12/08 455/435.2

FOREIGN PATENT DOCUMENTS

CN 101815296 A 8/2010
CN 103200628 A 7/2013
CN 107820242 A 3/2018

OTHER PUBLICATIONS

3rd Generation Partnership Project; Technical Specification Group Services and System Aspects; Security architecture and procedures for 5G system (Release 17), TS 33.501, V17.0.0, Dec. 16, 2020 (253 pages).
International Search Report and Written Opinion for PCT Appl. No. PCT/CN2021/071926, mailed Oct. 15, 2021 (7 pages).
First Office Action for CN Appl. No. 202180089655.9, dated Aug. 13, 2024 (with English translation, 16 pages).

* cited by examiner

*Primary Examiner* — Trang T Doan
(74) *Attorney, Agent, or Firm* — Foley & Lardner LLP

(57) ABSTRACT

A wireless communication method for use in a network entity is disclosed. The method comprises receiving, from a wireless terminal, an indicator associated with a capability of supporting at least one method of interacting with an external network for a packet data connection authentication and/or authorization of the external network, and performing a procedure based on the indicator, wherein the procedure is associated with establishing a packet data network connectivity in a second network.

12 Claims, 9 Drawing Sheets

METHOD FOR EXTERNAL AUTHENTICATION AND AUTHORIZATION

This application is a continuation of PCT/CN2021/071926, filed Jan. 14, 2021, the content of which is incorporated herein by reference in its entirety.

TECHNICAL FIELD

This document is directed generally to wireless communications, and in particular to external authentication and authorization.

BACKGROUND

In an evolved packet system (EPS), a password authentication protocol (PAP) and a challenge handshake authentication protocol (CHAP) are used as external authentication and authorization method if the external authentication and authorization are required during a packet data network (PDN) connectivity establishment procedure. In addition, an extensible authentication protocol (EAP) based external authentication and authorization for the PDN connection is not supported by the EPS.

SUMMARY

In an 5G system (5GS), in addition to the PAP and CHAP, the EAP is used as the external authentication and authorization method if the external authentication and authorization are required during a protocol data unit (PDU) session establishment procedure.

From security point of view, the PAP is an obsolete protocol. The CHAP provides a stronger security than the PAP. The EAP is the most recommended external authentication and authorization method compared to the PAP and the CHAP. In the 5GS, the PAP and/or the CHAP is still used for the user equipment (UE) using certain legacy applications.

Interworking with the evolved packet core (EPC) refers to mobility procedures between a 5G core network (5GC) and the EPC/E-UTRAN (Evolved Universal Terrestrial Radio Access Network). If a UE 1) transfers a PDU session which has been authenticated and authorized by an external data network (DN) by using the EAP in the 5GS to the EPS and 2) needs re-authentications, the UE requires the EPS to support the EAP-based external authentication and authorization method for the mapped access point name (APN) of the DN name (DNN).

If a UE wants to transfer a PDN connection session which has been authenticated and authorized by the external DN by the EAP in the EPS to the 5GS, the UE requires the 5GS to support the EAP-based external authentication and authorization for the mapped APN.

As can be seen from the above, how to support EAP based external authentication and authorization in the EPS becomes an issue to be discussed.

This document relates to methods, systems, and devices for the external authentication and authorization, and in particular to methods, systems, and devices for supporting the EAP-based external authentication and authorization in the EPS.

The present disclosure relates to a wireless communication method for use in a network entity, the method comprising:

receiving, from a wireless terminal, an indicator associated with a capability of supporting at least one method of interacting with an external network for a packet data connection authentication and/or authorization of the external network, and performing a procedure based on the indicator, wherein the procedure is associated with establishing a packet data network connectivity in a second network.

Various embodiments may preferably implement the following features:

Preferably or in some embodiments, the at least one method comprises at least one of:

an extensible authentication protocol, a password authentication protocol, or a challenge handshake authentication protocol.

Preferably or in some embodiments, the procedure is associated with transferring a protocol data unit session of the wireless terminal from a first network to the second network as the packet data network connectivity, wherein the protocol data unit session is established by using a first external authentication and/or authorization method with an external server.

Preferably or in some embodiments, the first network is associated with a 5G system and the second network is associated with an evolved packet system.

Preferably or in some embodiments, performing the procedure based on the indicator comprises determining whether to assign an evolved packet system bearer identifier to a quality of service flow of the protocol data unit session based on the indicator.

Preferably or in some embodiments, determining whether to assign the evolved packet system bearer identifier to the quality of service flow of the protocol data unit session based on the indicator comprises assigning the evolved packet system bearer identifier to the quality of service flow of the protocol data unit session when the indicator indicates that the first external authentication and/or authorization method is supported by the wireless terminal.

Preferably or in some embodiments, determining whether to assign the evolved packet system bearer identifier to the quality of service flow of the protocol data unit session based on the indicator comprises:

not assigning an evolved packet system bearer identifier to the quality of service flow of the protocol data unit session when at least one condition is met, wherein the at least one condition comprises at least one of:

the first external authentication and/or authorization method is not supported by the second network, the indicator indicates that the first external authentication and/or authorization method is not supported by the wireless terminal, or an access point name corresponding to a data network name of the protocol data unit session requires a second external authentication and/or authorization method different from the first external authentication and/or authorization method.

Preferably or in some embodiments, the first external authentication and/or authorization method is supported by the second network and the indicator indicates that the first external authentication and/or authorization method is supported by the wireless terminal, wherein performing the procedure based on the indicator comprises:

executing an external authentication and/or authorization procedure using the first external authentication and/or authorization method between the wireless terminal and the external server, transmitting, to the wireless terminal, an indicator indicating that the external authentication and/or authorization procedure is performing during the procedure, and performing the external authentication and/or authorization procedure between the wireless terminal and the external server.

Preferably or in some embodiments, performing the procedure based on the indicator comprises:

transmitting, to the wireless terminal, a cause value indicating a failure of the procedure when at least one condition is met, wherein the at least one condition comprises at least one of:

the first external authentication and/or authorization method is not supported by the second network, the indicator indicates that the first external authentication and/or authorization method is not supported by the wireless terminal, or an access point name corresponding to a data network name of the protocol data unit session requires a second external authentication and/or authorization method different from the first external authentication and/or authorization method.

Preferably or in some embodiments, an extensible authentication protocol is supported by the second network and the indicator indicates that the extensible authentication protocol is supported by the wireless terminal, wherein performing the procedure based on the indicator comprises:

executing an external authentication and/or authorization procedure using the extensible authentication protocol between the wireless terminal and an external server, transmitting, to the wireless terminal, an indicator indicating that the external authentication and/or authorization procedure is performing during the procedure, and performing the external authentication and/or authorization procedure between the wireless terminal and the external server.

The present disclosure relates to a wireless communication method for use in a wireless terminal, the method comprising:

transmitting, to a network entity, an indicator associated with a capability of supporting at least one method of interacting with an external network for a packet data connection authentication and/or authorization of the external network, and performing a procedure based on the indicator, wherein the procedure is associated with establishing a packet data network connectivity in a second network.

Various embodiments may preferably implement the following features:

Preferably, the at least one method comprises:

an extensible authentication protocol, a password authentication protocol, or a challenge handshake authentication protocol.

Preferably or in some embodiments, the procedure is associated with transferring a protocol data unit session of the wireless terminal from a first network to the second network as the packet data network connectivity, wherein the protocol data unit session is established by using a first external authentication and/or authorization method with an external server.

Preferably or in some embodiments, the first network is associated with a 5G system and the second network is associated with an evolved packet system.

Preferably or in some embodiments, the first external authentication and/or authorization method is supported by the second network and the indicator indicates that the first external authentication and/or authorization method is supported by the wireless terminal, wherein performing the procedure based on the indicator comprises:

receiving, from the network entity, an indicator indicating that an external authentication and/or authorization procedure using the first external authentication and/or authorization method is performing during the procedure, and performing the external authentication and/or authorization procedure with the network entity and an external server.

Preferably or in some embodiments, performing the procedure based on the indicator comprises:

receiving, from the network entity, a cause value indicating a failure of the procedure when at least one condition is met, wherein the at least one condition comprises at least one of:

the first external authentication and/or authorization method is not supported by the second network, the indicator indicates that the first external authentication and/or authorization method is not supported by the wireless terminal, or an access point name corresponding to a data network name of the protocol data unit session requires a second external authentication and/or authorization method different from the first external authentication and/or authorization method.

Preferably or in some embodiments, an extensible authentication protocol is supported by the second network and the indicator indicates that the extensible authentication protocol is supported by the wireless terminal, wherein performing the procedure based on the indicator comprises:

receiving, from the network entity, an indicator indicating that an external authentication and/or authorization procedure using the extensible authentication protocol is performing during the procedure, and performing the external authentication and/or authorization procedure with the network entity and an external server.

The present disclosure relates to a wireless communication method for use in a network entity, the method comprising:

performing a procedure of transferring a protocol data unit session of a wireless terminal from a first network to a second network as a packet data network connectivity, and performing at least one step during the procedure when an indicator is not received, wherein the indicator is associated with a capability of supporting at least one method of interacting with an external network for a packet data connection authentication and/or authorization of the external network.

Various embodiments may preferably implement the following features:

Preferably, the at least one method comprises at least one of:

an extensible authentication protocol, a password authentication protocol, or a challenge handshake authentication protocol.

Preferably or in some embodiments, the first network is associated with a 5G system and the second network is associated with an evolved packet system.

Preferably, the at least one step comprises at least one of:

not assigning an evolved packet system bearer identifier to a quality of service flow of the packet data unit session, or transmitting, to the wireless terminal, a cause value indicating a failure of the procedure.

The present disclosure relates to a network entity. The network entity comprises:

a communication unit, configured to receive, from a wireless terminal, an indicator associated with a capability of supporting at least one method of interacting with an external network for a packet data connection authentication and/or authorization of the external network, and a processor configured to perform a procedure based on the indicator, wherein the procedure is associated with establishing a packet data network connectivity in a second network.

Various embodiments may preferably implement the following feature:

Preferably or in some embodiments, the processor is further configured to perform any of the aforementioned wireless communication methods.

The present disclosure relates to a wireless terminal. The wireless terminal comprises:

a communication unit, configured to transmit, to a network entity, an indicator associated with a capability of supporting at least one method of interacting with an external network for a packet data connection authentication and/or authorization of the external network, and a processor configured to perform a procedure based on the indicator, wherein the procedure is associated with establishing a packet data network connectivity in a second network.

Various embodiments may preferably implement the following feature:

Preferably or in some embodiments, the processor is further configured to perform any of the aforementioned wireless communication methods.

The present disclosure relates to a network entity. The network entity comprises:

a communication unit, and a processor, configured to:

perform a procedure of transferring a protocol data unit session of a wireless terminal from a first network to a second network as a packet data network connectivity, and perform at least one step during the procedure when an indicator is not received by the communication unit.

Various embodiments may preferably implement the following feature:

Preferably or in some embodiments, the processor is further configured to perform any of the aforementioned wireless communication methods.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF DRAWINGS

The above and other aspects and their implementations are described in greater detail in the drawings, the descriptions, and the claims.

DESCRIPTION OF EMBODIMENTS

Figure 1:
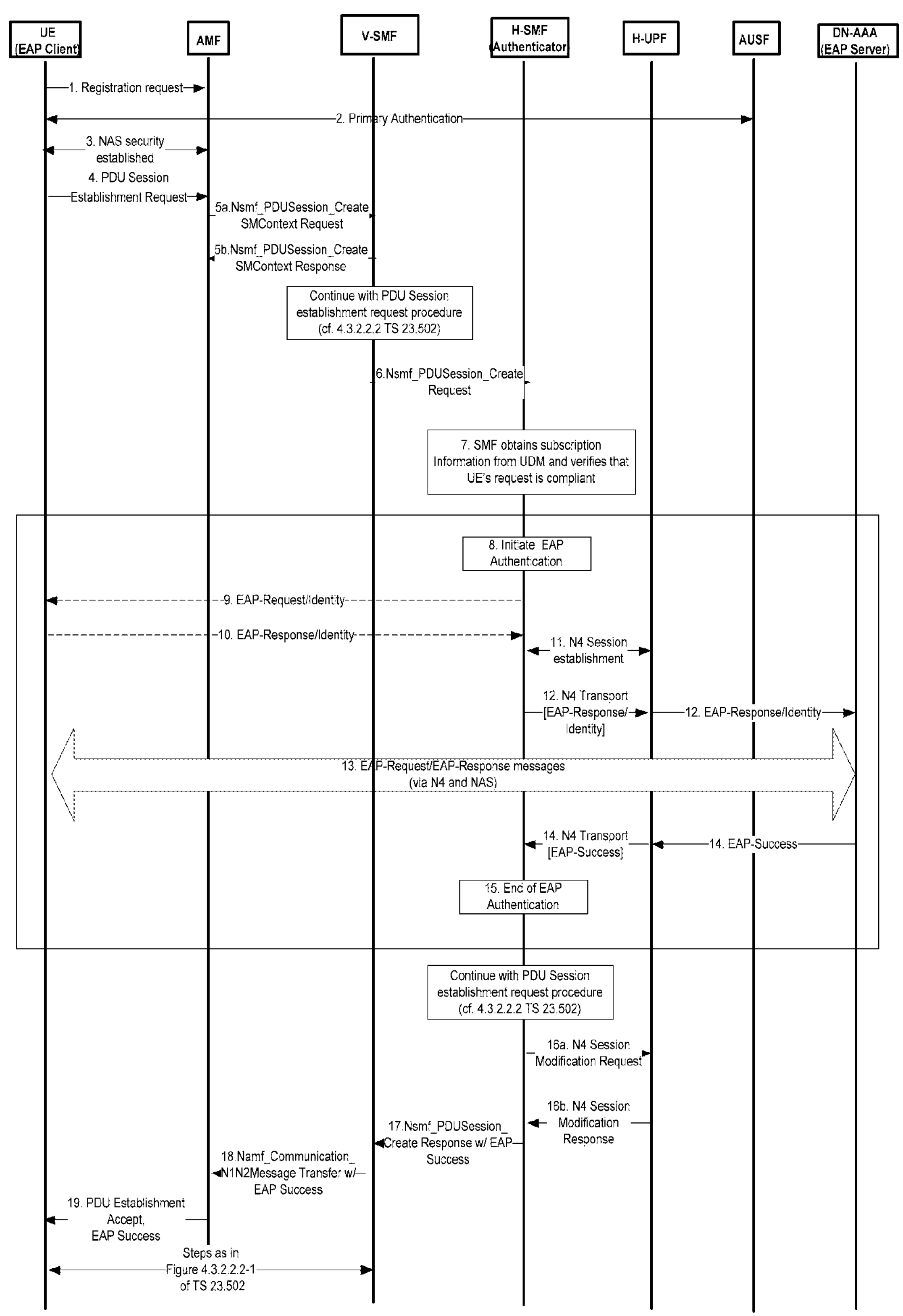
FIG. 1 shows a schematic diagram of security procedures according to an embodiment of the present disclosure.

FIG. 1 shows procedures between UE and external data network via 5G Network according to an embodiment of the present disclosure.

As specified in 3rd generation partner project (3GPP) TS 33.501, the EAP framework specified in request for comments (RFC) 3748 shall be used for the authentication between the UE and a data network-AAA (DN-AAA) server in the external data network. In addition, a session management function (SMF) shall perform the role of the EAP authenticator. In the non-roaming scenario, the SMF shall perform the role of the EAP authenticator. In the local break out scenario, the visitor SMF (V-SMF) of the visited network shall perform the role of the EAP authenticator. The EAP authenticator shall rely on the external DN-AAA server to authenticate and authorize the request from the UE for the establishment of PDU sessions.

Between the UE and the SMF, EAP messages shall be sent in the session management (SM) non-access stratum (NAS) message. The SM NAS message is received at the access and mobility management function (AMF) over an interface N1 and delivered to the SMF over an interface N11 using either the Nsmf_PDUSession_CreateSMContext service operation or the Nsmf_PDUSession_Update SM Context service operation, as specified in 3GPP TS 23.502. The SMF that takes the role of the EAP authenticator communicates with the external DN-AAA server over interfaces N4 and N6 via the user plane function (UPF).

The SMF invokes the Namf_Communication_N1N2MessageTransfer service operation to transfer the N1 NAS message containing the EAP message, towards the UE via the AMF.

Figure 2:
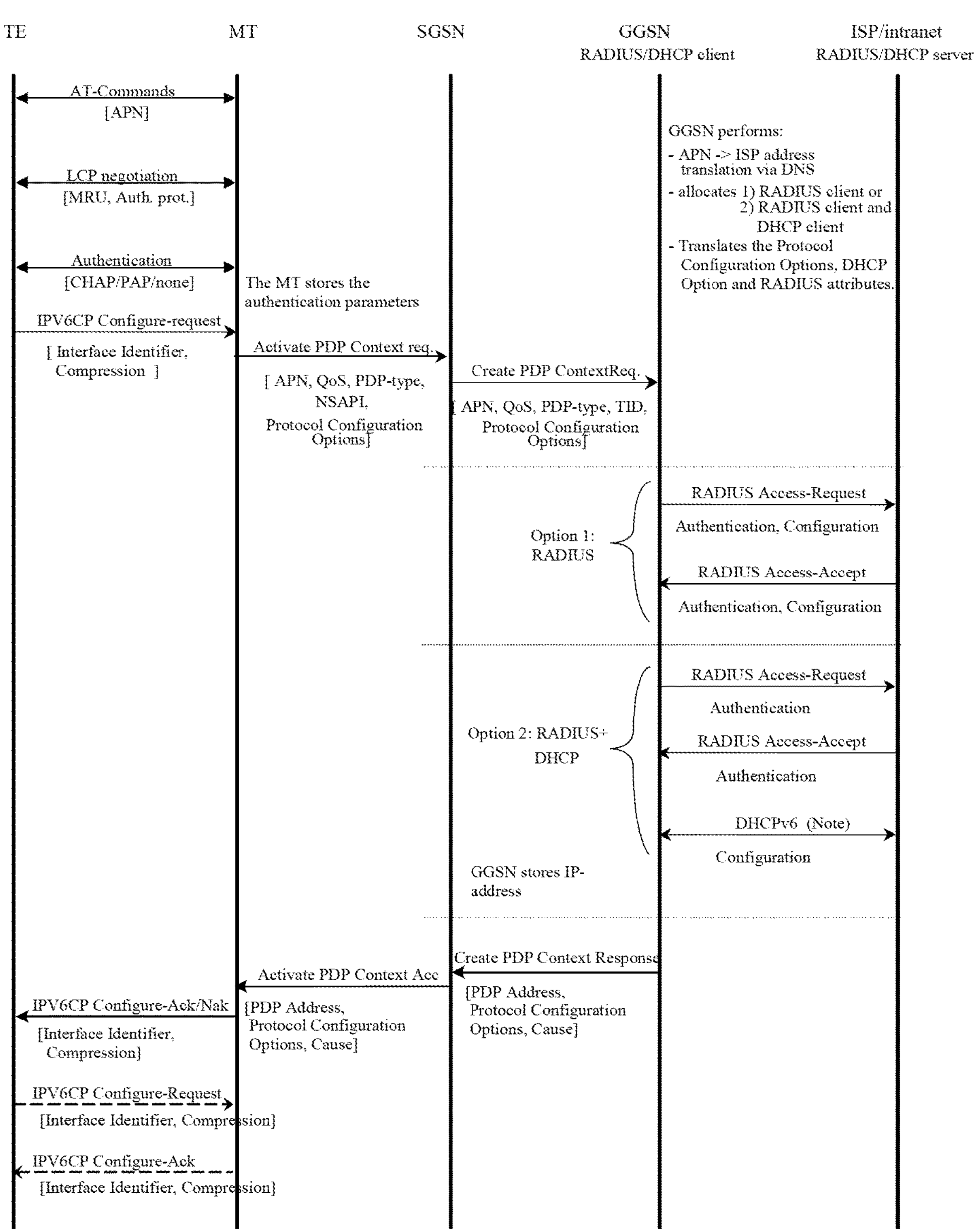
FIG. 2 shows a schematic diagram of security procedures according to an embodiment of the present disclosure.

FIG. 2 shows a schematic diagram of security procedures between UE and external data networks via 3G/4G network according to an embodiment of the present disclosure.

Specifically, when a Gateway General Packet Radio Service (GPRS) Support Node (GGSN) receives a Create packet data protocol (PDP) Context Request message for a given access point name (APN), the GGSN shall immediately send a Create PDP context response back to the Serving GPRS Support node (SGSN). After a PPP link setup, an authentication phase may take place. During the authentication phase, the GGSN sends a RADIUS Access-Request to an AAA server. The AAA server authenticates and authorizes the user. If RADIUS server is also responsible for internet protocol (IP) address allocation, the AAA server shall return the allocated IP address or IP version 6 (Ipv6) prefix in an Access-Accept message (if the user was authenticated).

If the user is not authenticated, the GGSN shall send a Delete PDP context request to the SGSN.

Even if the GGSN was not involved in the user authentication (e.g., for PPP no authentication may be selected), the GGSN may send a RADIUS Accounting-Request START message to the AAA server. This message contains parameters, e.g., a tuple which includes the user-id and IP address or Ipv6 prefix, to be used by application servers (e.g., WAP gateway) for identifying the user. This message also indicates the AAA server that the user session has started and quality of service (QoS) parameters associated to the session.

If some external applications require RADIUS Accounting request (Start) information before they can process user packets, then the selected APN (GGSN) may be configured in such a way that the GGSN drops user data until the Accounting Response (START) is received from the AAA server. The GGSN may delete the PDP context if the Accounting Response (START) is not received. The Authentication and Accounting servers may be separately configured for each APN.

When the GGSN receives a Delete PDP Context Request message and providing a RADIUS Accounting-Request START message was sent previously, the GGSN shall send a RADIUS Accounting-Request STOP message to the AAA server, which indicates the termination of this particular user session. The GGSN shall immediately send a Delete PDP context response, without waiting for an Accounting-Response STOP message from the AAA server.

Accounting-Request ON and Accounting-Request OFF messages may be sent from the GGSN to the AAA server to ensure the correct synchronization of the session information in the GGSN and the AAA server.

The GGSN may send an Accounting-Request ON message to the AAA server to indicate that a restart has occurred. The AAA server may then release the associated resources.

Prior to a scheduled restart, the GGSN may send Accounting-Request OFF message to the AAA server, the AAA server may then release the associated resources.

If an Access-Challenge is sent to the GGSN when using PPP PDP type, the GGSN shall handle it by PPP CHAP providing PPP CHAP was the selected Authentication protocol. If CHAP authentication was not selected, authentication shall fail within RFC 2865.

Figure 3:
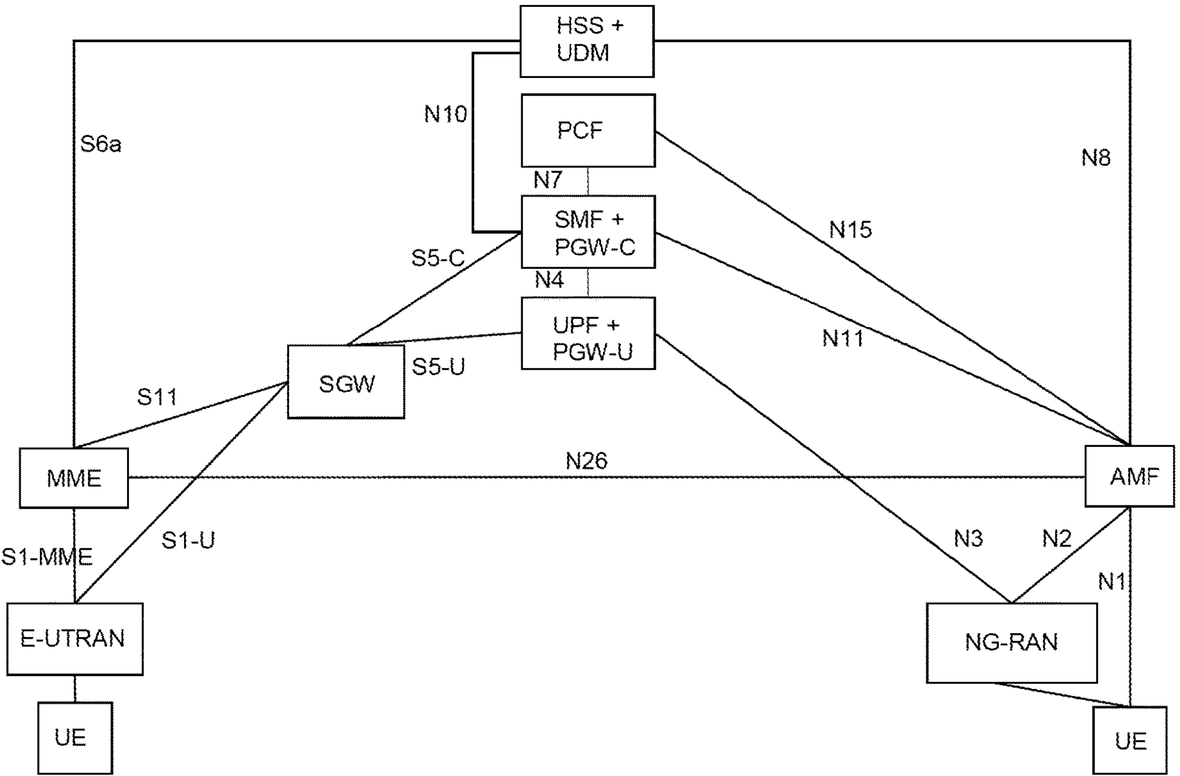
FIG. 3 shows a schematic diagram of a network architecture according to an embodiment of the present disclosure.

FIG. 3 shows a schematic diagram of a network architecture according to an embodiment of the present disclosure. The network architecture shown in FIG. 3 is able to interwork with the EPC, i.e., to perform mobility procedures between 5GC and EPC/E-UTRAN.

During an E-UTRAN Initial attach procedure, the UE supporting both the 5GC NAS and the EPC NAS shall indicate its support of the 5G NAS in UE Network Capability as described in clause 5.11.3 of 3GPP TS 23.401.

During the registration to the 5GC, the UE supporting both the 5GC NAS and the EPC NAS shall indicate its support of the EPC NAS. This indication may be used to give a priority towards selection of PGW-C+SMF (PDN gateway-control plane function plus SMF) for UEs that support both the EPC NAS and 5GC NAS.

Networks that support interworking with EPC may support interworking procedures that use the interface N26 or interworking procedures that do not use the interface N26. The interworking procedures with the N26 support providing IP address continuity on inter-system mobility to the UEs, which support both the 5GC NAS and the EPC NAS and operate in single registration mode. Networks that support interworking procedures without the N26 shall support procedures of providing the IP address continuity on inter-system mobility to the UEs operating in both single-registration mode and dual-registration mode. In such networks, the AMF shall provide the indication that interworking without N26 is supported to UEs during initial Registration in 5GC or MME may optionally provide the indication that interworking without N26 is supported by the Attach procedure in EPC as defined in TS 23.401.

If the network does not support interworking with EPC, the network shall not indicate support for "interworking without N26" to the UE.

For interworking without N26 interface:

if the PDU session supports interworking, the PGW-C+SMF stores the PGW-C+SMF FQDN to SMF context in HSS+UDM (Home Subscriber Server+Unified Data Management) when the SMF is registered to the HSS+UDM.

For an APN, the HSS+UDM selects one of the stored PGW-C+SMF FQDN (fully qualified domain name) based on operator's policy.

For interworking with N26 interface:

For a DNN, the AMF determines PDU session(s) associated with 3GPP access in only one PGW-C+SMF supporting the EPS interworking via the EBI allocation procedure as described in clause 4.11.1.4.1 of 3GPP TS 23.502.

- If the network supports the EPS interworking of the non-3GPP access connected to the 5GC, the AMF serving the 3GPP access notifies the UDM to store the association between DNN and PGW-C+SMF FQDN which supports EPS interworking as Intersystem continuity context, to avoid MME receiving inconsistent PGW-C+SMF FQDN from AMF and HSS+UDM.
- The AMF updates Intersystem continuity context if the PGW-C+SMF and DNN association is changed due to the AMF selecting another PGW-C+SMF for EPS interworking for the same DNN.
- If the PGW-C+SMF FQDN and associated DNN exists in Intersystem continuity context, the HSS+UDM provides MME with PGW-C+SMF FQDN and associated APN.

Embodiment I

Figure 4:
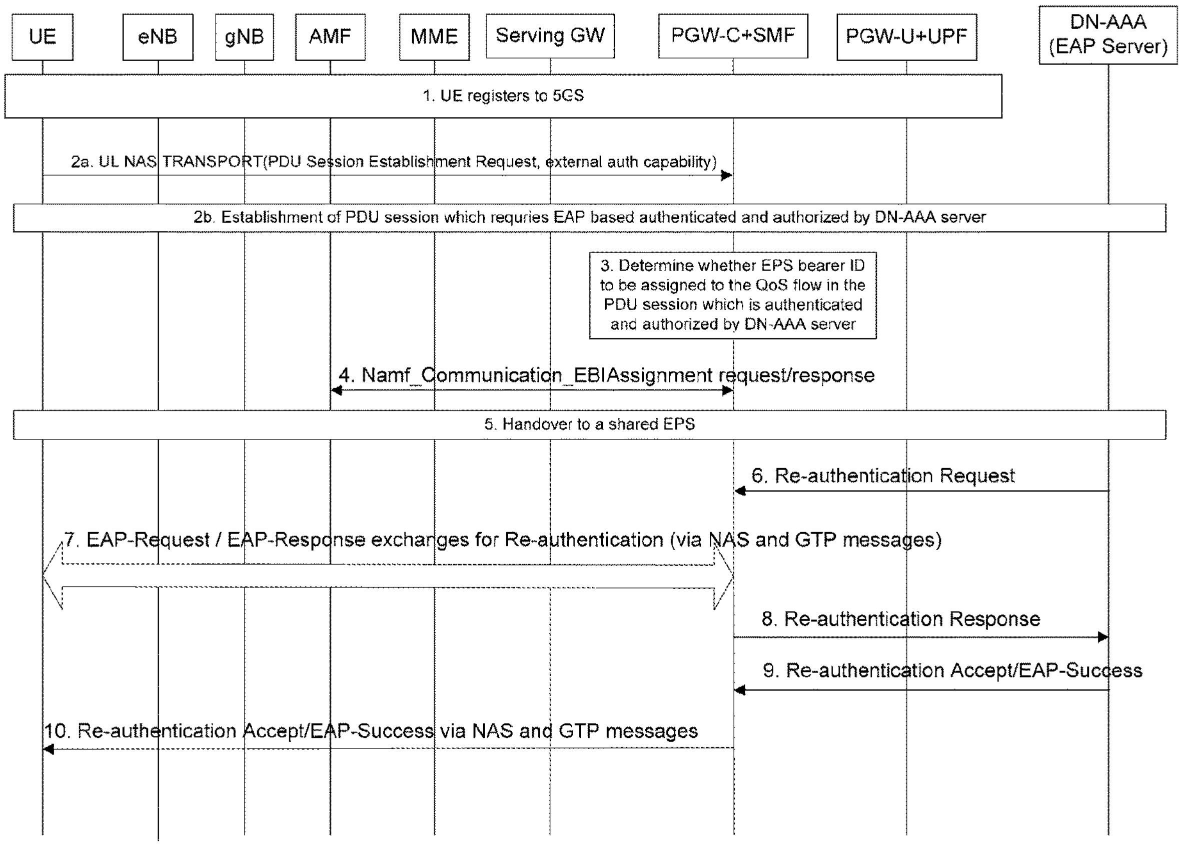
FIG. 4 shows a schematic diagram of procedures of handling a protocol data unit session to a packet data network connectivity according to an embodiment of the present disclosure.

FIG. 4 shows procedures of handling a PDU session to a PDN connectivity according to an embodiment of the present disclosure. In this embodiment, the UE has registered to the 5GC and establishes a PDU session which has been authenticated and authorized by an external authentication server (e.g., an EAP server). Next, the UE moves to an area with only eNB coverage and a handover to a shared EPS is performed. Here, it is assumed that mobility is performed from the 5GS to the EPS with the N26 interface.

In step 1, the UE registers to the 5GS. As an alternative or in addition, the UE may provide an indicator of the capability of external authentication and authorization in the EPS to the network (e.g., AMF).

In step 2*a*, the UE sends a NAS message to the AMF, wherein the NAS message includes at least one of a PDU session establishment request or an indicator of the capability of external authentication and authorization in the EPS. The capability is associated with support of methods for interacting with the external DN for transmitting signaling of packet data connection authentication/authorization of the external DN. In an embodiment, the method comprises:

EAP (Extensible Authentication Protocol)

The AMF selects an appropriate SMF+PGW-C node which may support the external authentication and authorization method in the EPS indicated by the UE.

In step 2*b*, the PDU session with the external authentication and authorization is established.

In step 3, based on the indicator of the capability of external authentication and authorization in the EPS provided by the UE, the SMF+PGW-C determines whether an EPS bearer ID should be assigned to the QoS flow in the PDU session which is authenticated and authorized by the DN-AAA server. If the external authentication and authorization method used by this PDU session in the EPS is not supported or allowed, the SMF+PGW-C determines not to assign the EBI. Otherwise, the SMF+PGW-C assigns the EBI to the PDU session. In this embodiment, the indicator of the capability of external authentication and authorization in the EPS provided by the UE indicates that the UE supports the external authentication and authorization method used by this PDU session in the EPS.

In step 4, the SMF+PGW-C invokes Namf_Communication_EBIAssignment request to the AMF. If the AMF successfully assigns the EBI(s), the AMF responds with the assigned EBI(s). Otherwise, the AMF responds with a cause indicating EBI assignment failure.

In step 5: Handover procedure from the 5GS to the EPS based on the N26 interface is performed.

In steps 6 to 10, after transferring the PDU session to the EPS as a PDN connectivity, the DN-AAA server may initiate an EAP re-authentication procedure to the UE.

Embodiment II

Figure 5:
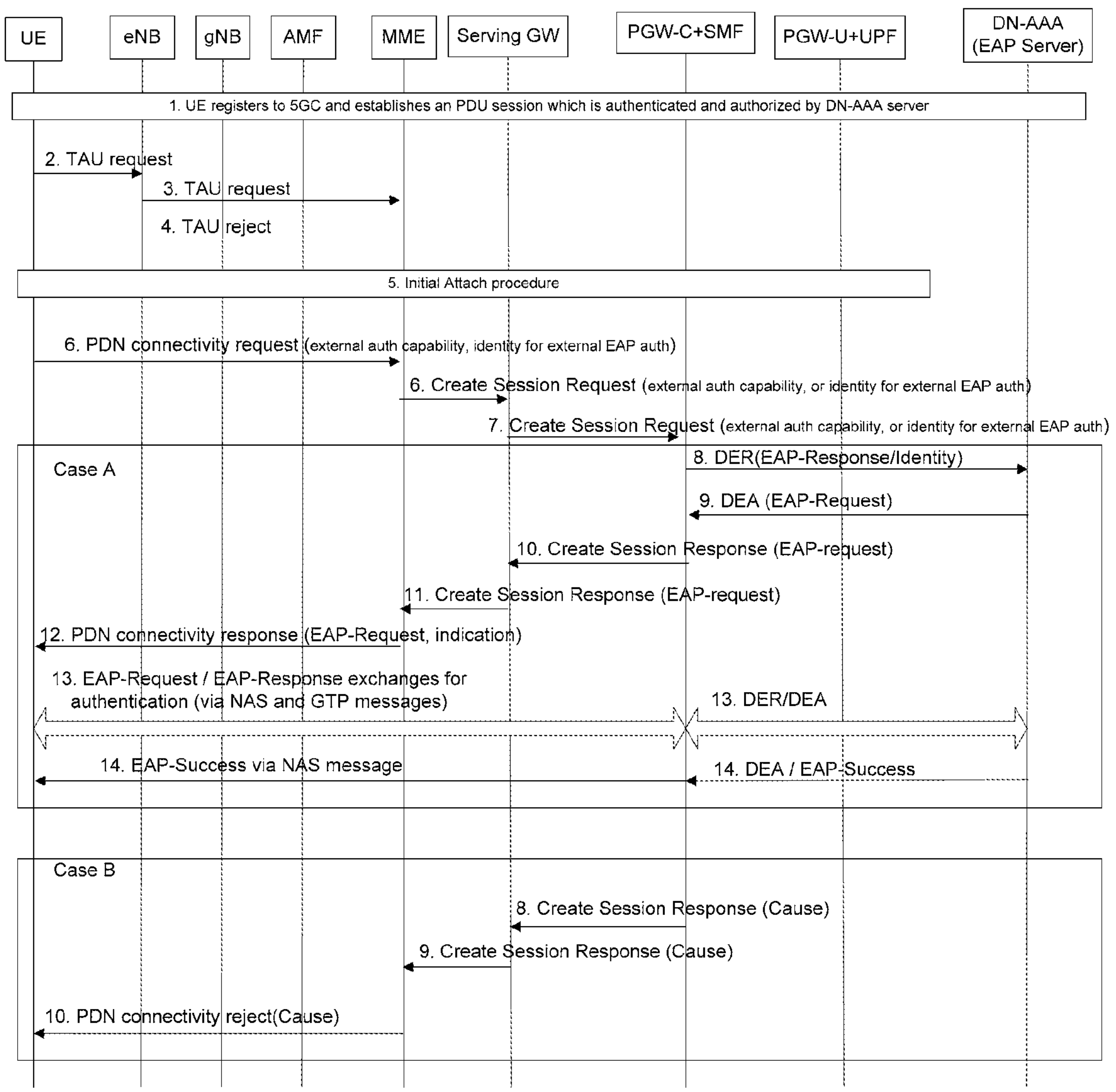
FIG. 5 shows a schematic diagram of procedures of handling a protocol data unit session to a packet data network connectivity according to an embodiment of the present disclosure.

FIG. 5 shows procedures of handling a PDU session to a PDN connectivity according to an embodiment of the present disclosure. In this embodiment, the UE has registered to the 5GC and establishes a PDU session which has been authenticated and authorized by an external authentication server (e.g., an EAP server). Then, the UE moves to the area with only the eNB coverage and a handover to a shared EPS is performed. Here, it is assumed that mobility is performed from the 5GS to the EPS without the N26 interface.

Steps 1 to 5, the UE is registered in the 5GS and establishes PDU sessions and a PDU session has been EAP based authentication and authorization by the external DN. The UE initiates a TAU request to move to the EPS. The MME determines that the old node is an AMF based on UE's GUTI mapped from the 5G-GUTI and the MME is configured to support the 5GS-EPS interworking without the N26 procedure. The MME sends a TAU Reject (message) to the UE and the UE initiates an initial attach procedure to the EPS.

In step 6, if the UE wants to transfer the PDN connectivity to the EPS and maintain the same IP address/prefix, the UE performs the UE requested PDN Connectivity Procedure as specified and sets the Request Type to "handover" in Step 1 of the procedure with modification captured in clause 4.11.2.4.2. The UE provides an APN and the PDU Session ID corresponding to the PDU Session the UE wants to transfer to EPS. The UE may also provide an indicator of the capability of external authentication and authorization in the EPS. The capability refers to support of methods for interaction with external DN for transport of signaling for packet data connection authentication/authorization by external DN, including but not limited to:

EAP (Extensible Authentication Protocol)

In addition, the UE can include the identity for external EAP authentication in the PDN connectivity request.

Case A:

If:

- the PDU session ID corresponding to the PDU session was established with the EAP based external authentication and authorization in the 5GS;
- the EAP based external authentication and authorization is supported or allowed in EPS; and
- the UE indicates support of EAP based external authentication and authorization, the SMF+PGW-C accepts the PDN connectivity request.

In steps 8 to 12 of case A, if the SMF+PGW-C receives the identity for external EAP authentication in the PDN connectivity request, the SMF+PGW-C will proceed with external authentication and authorization between the UE and DN-AAA server. The UE receives the EAP authentication request and/or the indicator in the PDN connectivity response. The indicator is configured to indicate the UE that external authentication and authorization for the PDN connectivity establishment is performing/undergoing and/or needs/requires to be performed. In this case, the UE would not consider the PDN connectivity establishment is completed.

In steps 513*a* and 514*a*, the UE and the network proceed further procedure to complete the external authentication and authorization procedure. The UE considers that the PDN connectivity is successfully established when receiving the EAP-Success.

Case B:

If the PDU session ID corresponding to the PDU session was established with EAP based external authentication and authorization in 5GS but:

a) the EAP based external authentication and authorization is not supported or allowed in EPS;
b) the UE does not indicate support of EAP based external authentication and authorization;
c) the UE provides no indicator about the capability of the external authentication and authorization in EPS; or
d) the mapped APN of the DNN requires different external authentication method in the EPS, the SMF+PGW-C rejects the PDN connectivity request (i.e., steps 8 to 10 in case B). In an embodiment, the SMF+PGW-C rejects the PDN connectivity request with a cause value indicating:

1) for a) or b) or c) the requiring external authentication not supported, or
2) for d) external authentication is required.

Embodiment III

Figure 6:
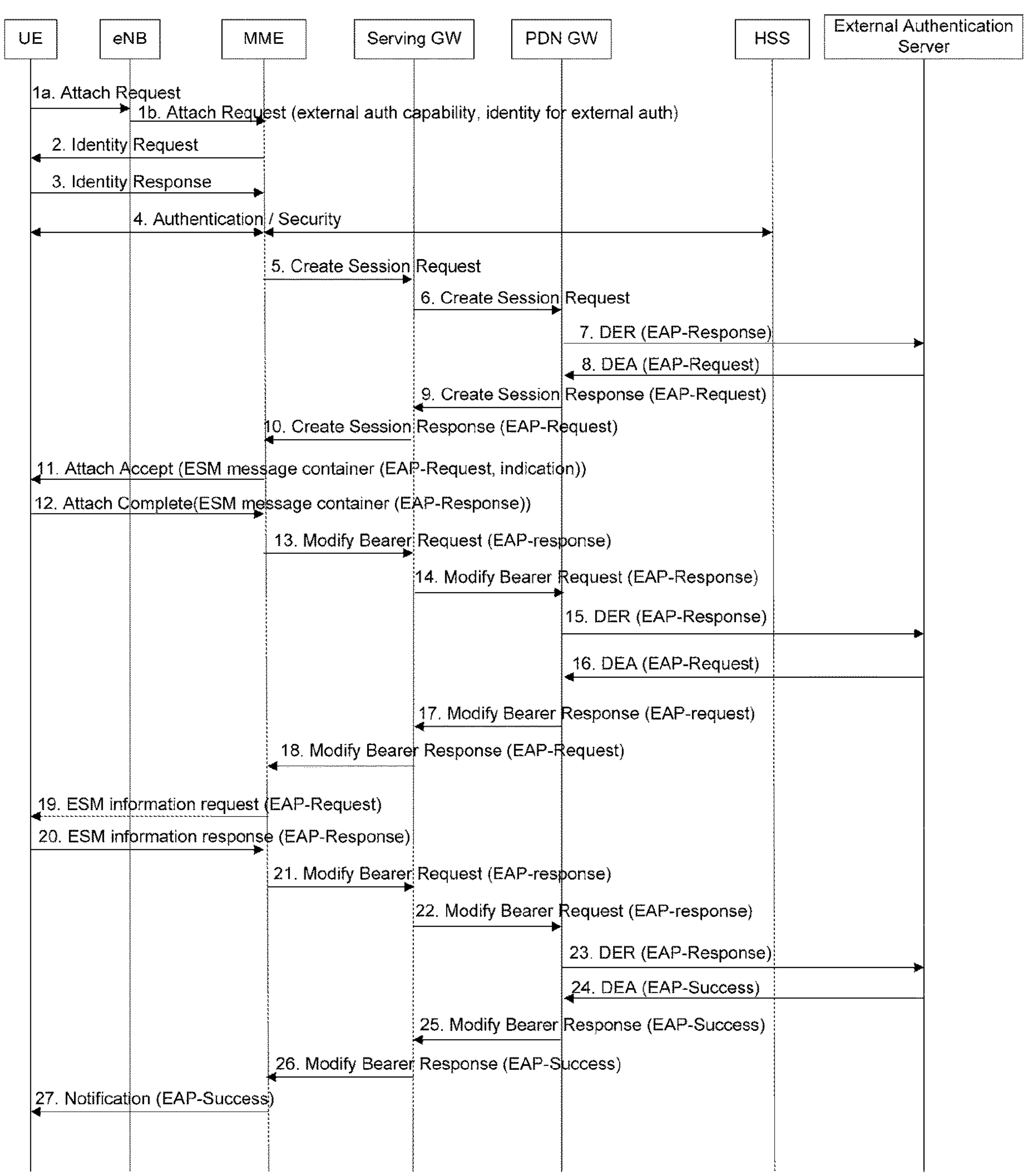
FIG. 6 shows a schematic diagram of a procedure of initial attach with a PDN connectivity establishment according to an embodiment of the present disclosure.

In this embodiment, the EPS network supports multiple authentication/authorization methods (e.g., EAP based, PAP and CHAP authentication, etc) by an external authentication server during the establishment of a PDN connectivity. The initial attach procedure with a PDN connectivity establishment is shown in FIG. 6.

In steps 1*a* and 1*b*, the UE initiates an attach procedure and includes its capability of its external authentication and authorization for PDN connectivity establishment in the attach request. The capability refers to support of methods for interaction with external DN for transport of signaling for packet data connection authentication/authorization by external DN, including but not limited to:

EAP (Extensible Authentication Protocol)

The UE may also include the identity for external authentication in the attach request.

In steps 2 to 4: The authentication and NAS security setup to activate integrity protection and NAS ciphering is performed.

In steps 5 to 7, the MME determines to establish a PDN connection which requires the EAP-based authentication and authorization by the external authentication server and selects an appropriate SGW to send a Create Session Request to the serving gateway (SGW). The SGW selects an appropriate PDN gateway (PGW) and sends the corresponding Create Session Request to the PGW. The PGW initiates the authentication request to external authentication server and includes the identity for external authentication if provisioned by the UE in steps 1*a* and 1*b*.

In steps 8 to 11, the external authentication server sends an authentication request via Diameter message including EAP-request to the PGW. The EAP-request message along with an indicator is transported via a GPRS tunneling protocol control (GTP-C) message from the PGW to the MME. The indicator is configured to indicate the UE that the external authentication and authorization for the PDN connectivity establishment is currently performing/undergoing and/or needs/requires to be performed. The UE receives the EAP-request and the indicator in the NAS message sent by the MME. The UE would not consider the PDN connectivity establishment as being completed.

In steps 12 to 27, the UE and the network proceed procedure(s) to complete the external authentication and authorization procedure. The PDN connectivity is considered successfully established when the EAP-Success (message) is received by the UE.

Figure 7:
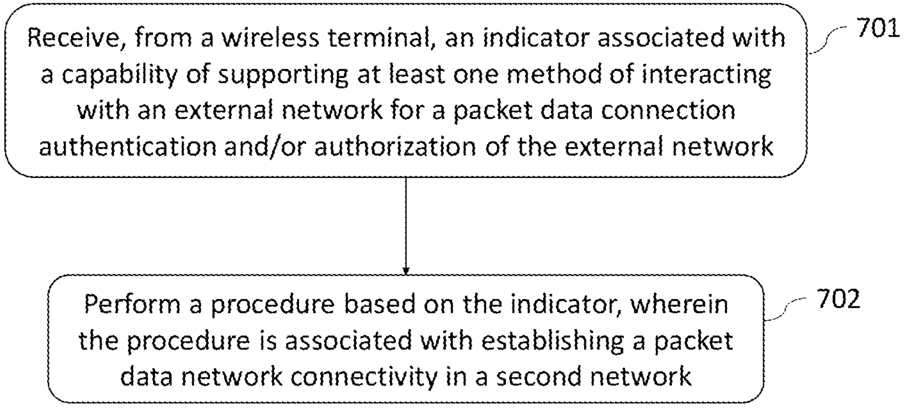
FIG. 7 shows a flowchart of a process according to an embodiment of the present disclosure.

FIG. 7 shows a flowchart of a process according to an embodiment of the present disclosure. The process shown in FIG. 7 may be used in a network entity (e.g., PGW-C+SMF and/or MME and/or AMF) and comprises the following steps:

Step 701: Receive, from a wireless terminal, an indicator associated with a capability of supporting at least one method of interacting with an external network for a packet data connection authentication and/or authorization of the external network.

Step 702: Perform a procedure based on the indicator, wherein the procedure is associated with establishing a packet data network connectivity in a second network.

In FIG. 7, a wireless terminal (e.g., UE) may provide an indicator to the network entity. The indicator is associated with a capability of supporting at least one method of interacting with an external network (e.g., external DN, DN-AAA server or external authentication server) for a packet data connection (e.g., PDU session or PDN connectivity) authentication/authorization of the external network. Based on the indicator, the network entity performs a procedure associated with establishing a PDN connectively in a second network (e.g., EPS). In the present disclosure, authentication/authorization may be equal to authentication and/or authorization. In an embodiment, the capability is associated with the wireless terminal and/or the second network. That is, the indicator may indicate at least one of:

- a capability of the wireless terminal supporting the at least one method of interacting with an external network for the packet data connection authentication/authorization of the external network,
- a capability of supporting the at least one method of interacting with an external network for the packet data connection authentication/authorization of the external network in the second network, or
- a capability of the wireless terminal supporting the at least one method of interacting with an external network for the packet data connection authentication/authorization of the external network in the second network.

In an embodiment, the at least one method comprises at least one of:

EAP,
PAP, or
CHAP.

In an embodiment, the procedure is associated with transferring a PDU session of the wireless terminal from a first network (e.g., 5GS) to the second network as the PDN connectivity (e.g., procedure shown in FIG. 4 or 5). In this embodiment, the PDU session is established by using a first external authentication/authorization method with an external server (e.g., external network). For example, the first external authentication/authorization method is the EAP and is not limited herein.

In an embodiment, the first network is associated with a 5GS and the second network is associated with an EPS.

In an embodiment, the procedure performed by the network entity based on the indicator comprises:

determining whether to assign an EBI to a QoS flow of the PDU session based on the indicator.

In an embodiment, the network entity may (determine to) assign the EBI to the QoS flow of the PDU session when the indicator indicates that the first external authentication/authorization method is supported by the wireless terminal.

In an embodiment, the network entity may (determine to) not assign the EBI to the QoS flow of the PDU session when at least one condition is met. The at least one condition comprises at least one of:

1) the first external authentication and/or authorization method is not supported by the second network,
2) the indicator indicates that the first external authentication and/or authorization method is not supported by the wireless terminal, or
3) an APN corresponding to a DNN of the protocol data unit session requires a second external authentication and/or authorization method different from the first external authentication and/or authorization method.

Please note that, in condition 1), the first external authentication/authorization method may refer to any external authentication/authorization method which is supported by the first network and is not supported by the second network. Similarly, in condition 2), the first external authentication/authorization method may refer to any external authentication/authorization method which is supported by the first network and is not supported by the wireless terminal. In all of the conditions 1), 2) and 3), the first external authentication/authorization method may be the EAP-based external authentication/authorization method and is not limited herein.

In an embodiment, the first external authentication and/or authorization method is supported by the second network and the indicator indicates that the first external authentication and/or authorization method is supported by the wireless terminal. In this embodiment, the procedure performed by the network entity based on the indicator comprises:

executing (e.g., initiating, starting, beginning) an external authentication/authorization procedure using the first external authentication/authorization method between the wireless terminal and the external server, transmitting, to the wireless terminal, an indicator indicating that the external authentication/authorization procedure is performing during the procedure, and performing (e.g., completing) the external authentication and/or authorization procedure between the wireless terminal and the external server.

In an embodiment, the procedure performed by the network entity based on the indicator comprises:

transmitting, to the wireless terminal, a cause value indicating a failure of the procedure when at least one condition is met (e.g., steps 8 to 10 of Case B in FIG. 5). In this embodiment, the at least one condition comprises at least one of:

1) the first external authentication and/or authorization method is not supported by the second network,
2) the indicator indicates that the first external authentication and/or authorization method is not supported by the wireless terminal, or
3) an access point name corresponding to a data network name of the protocol data unit session requires a second external authentication and/or authorization method different from the first external authentication and/or authorization method.

Please note that, in condition 1), the first external authentication/authorization method may refer to any external authentication/authorization method which is supported by the first network and is not supported by the second network. Similarly, in condition 2), the first external authentication/authorization method may refer to any external authentication/authorization method which is supported by the first network and is not supported by the wireless terminal. In all of conditions 1), 2) and 3), the first external authentication/authorization method may be the EAP-based external authentication/authorization method and is not limited herein.

In an embodiment, the EAP is supported by the second network and the indicator indicates that EAP is supported by the wireless terminal. In this embodiment, the procedure performed by the network entity based on the indicator comprises:

executing an external authentication and/or authorization procedure using the extensible authentication protocol between the wireless terminal and an external server, transmitting, to the wireless terminal, an indicator indicating that the external authentication and/or authorization procedure is performing during the procedure, and performing the external authentication and/or authorization procedure between the wireless terminal and the external server (e.g., FIG. 6).

Figure 8:
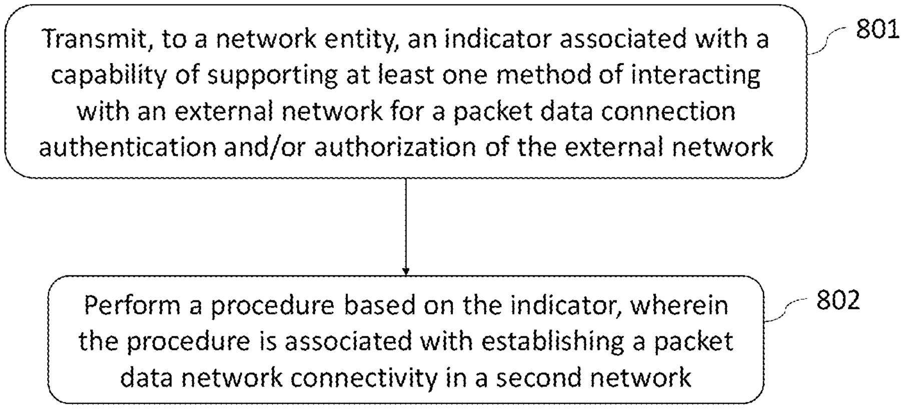
FIG. 8 shows a flowchart of a process according to an embodiment of the present disclosure.

FIG. 8 shows a flowchart of a process according to an embodiment of the present disclosure. The process shown in FIG. 8 may be used in a wireless terminal (e.g., UE) and comprises the following steps:

Step 801: Transmit, to a network entity, an indicator associated with a capability of supporting at least one method of interacting with an external network for a packet data connection authentication and/or authorization of the external network.

Step 802: Perform a procedure based on the indicator, wherein the procedure is associated with establishing a packet data network connectivity in a second network.

In FIG. 8, the wireless terminal transmits (e.g., provides) an indicator to a network entity (e.g., PGW-C+SMF and/or AMF and/or MME), wherein this indicator is associated with a capability of supporting at least one method of interacting with an external network (e.g., external DN, DN-AAA or external authentication server) for a packet data connection authentication/authorization of the external network. Based on the indicator, the network entity performs a procedure associated with establishing a PDN connectively in a second network (e.g., EPS). In an embodiment, the capability is associated with the wireless terminal and/or the second network. That is, the indicator may indicate at least one of:

a capability of the wireless terminal supporting the at least one method of interacting with an external network for the packet data connection authentication/authorization of the external network, a capability of supporting the at least one method of interacting with an external network for the packet data connection authentication/authorization of the external network in the second network, or a capability of the wireless terminal supporting the at least one method of interacting with an external network for the packet data connection authentication/authorization of the external network in the second network.

In an embodiment, the at least one method comprises:

EAP,

PAP, or

CHAP.

In an embodiment, the procedure is associated with transferring a PDU session of the wireless terminal from a first network (e.g., 5GS) to the second network (e.g., EPS) as the PDN connectivity. In this embodiment, the PDU session is established by using a first external authentication and/or authorization method with an external server (e.g., the external network).

In an embodiment (e.g., FIG. 4 or 5), the first external authentication/authorization method is supported by the second network and the indicator indicates that the first external authentication and/or authorization method is supported by the wireless terminal. Under such conditions, the procedure performed by the wireless terminal based on the indicator comprises:

receiving, from the network entity, an indicator indicating that an external authentication/authorization procedure using the first external authentication/authorization method is performing during the procedure, and performing the external authentication/authorization procedure with the network entity and an external server (e.g., the external network).

In an embodiment, the procedure performed by the wireless terminal based on the indicator comprises receiving, from the network entity, a cause value indicating a failure of the procedure when at least one condition is met. The at least one condition may comprise at least one of:

1) the first external authentication and/or authorization method is not supported in the second network,
2) the indicator indicates that the first external authentication and/or authorization method is not supported by the wireless terminal, or
3) an access point name corresponding to a data network name of the protocol data unit session requires a second external authentication and/or authorization method different from the first external authentication and/or authorization method.

Please note that, in condition 1), the first external authentication/authorization method may refer to any external authentication/authorization method which is supported by the first network and is not supported by the second network. Similarly, in condition 2), the first external authentication/authorization method may refer to any external authentication/authorization method which is supported by the first network and is not supported by the wireless terminal. In all of conditions 1), 2) and 3), the first external authentication/authorization method may be the EAP-based external authentication/authorization method and is not limited herein.

In an embodiment (e.g., FIG. 6), the EAP is supported by the second network and the indicator indicates that the EAP is supported by the wireless terminal. Under such conditions, the procedure performed by the wireless terminal based on the indicator comprises:

receiving, from the network entity, an indicator indicating that an external authentication/authorization procedure using the first external authentication/authorization method is performing during the procedure, and performing (e.g., completing) the external authentication/authorization procedure with the network entity and an external server (e.g., the external network).

Figure 9:
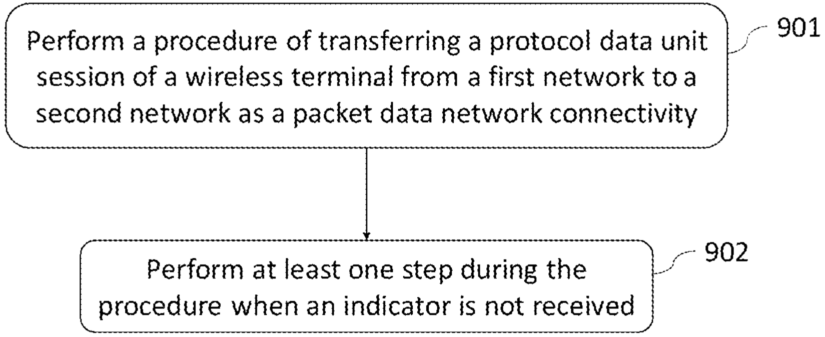
FIG. 9 shows a flowchart of a process according to an embodiment of the present disclosure.

FIG. 9 shows a flowchart of a process according to an embodiment of the present disclosure. The process shown in FIG. 9 may be used in a network entity (e.g., PGW-C+SMF and/or AMF and/or MME) and comprises the following steps:

Step 901: Perform a procedure of transferring a protocol data unit session of a wireless terminal from a first network to a second network as a packet data network connectivity.

Step 902: Perform at least one step during the procedure when an indicator is not received.

In FIG. 9, the network entity performs a procedure of transferring a PDU session of a wireless terminal (e.g., UE) from a first network (e.g., 5GS) to a second network (e.g., EPS) as a PDN connectivity. In this embodiment, the network entity does not receive an indicator, e.g., from the wireless terminal. The indicator indicates a capability of supporting at least one method of interacting with an external network (e.g., external DN, DN-AAA, or external authentication server) for a packet data connection authentication/authorization of the external network. Under such conditions, the network entity performs at least one step during the procedure.

In an embodiment, the capability is associated with the wireless terminal and/or the second network. That is, the indicator may indicate at least one of:

a capability of the wireless terminal supporting the at least one method of interacting with an external network for the packet data connection authentication/authorization of the external network, a capability of supporting the at least one method of interacting with an external network for the packet data connection authentication/authorization of the external network in the second network, or a capability of the wireless terminal supporting the at least one method of interacting with an external network for the packet data connection authentication/authorization of the external network in the second network.

In an embodiment, the at least one method comprises at least one of:

EAP,
PAP, or
CHAP.

In an embodiment, the first network is associated with a 5GS and the second network is associated with an EPS.

In an embodiment, the at least one step comprises:

not assigning an evolved packet system bearer identifier to a quality of service flow of the packet data unit session, and/or transmitting, to the wireless terminal, a cause value indicating a failure of the procedure.

Figure 10:
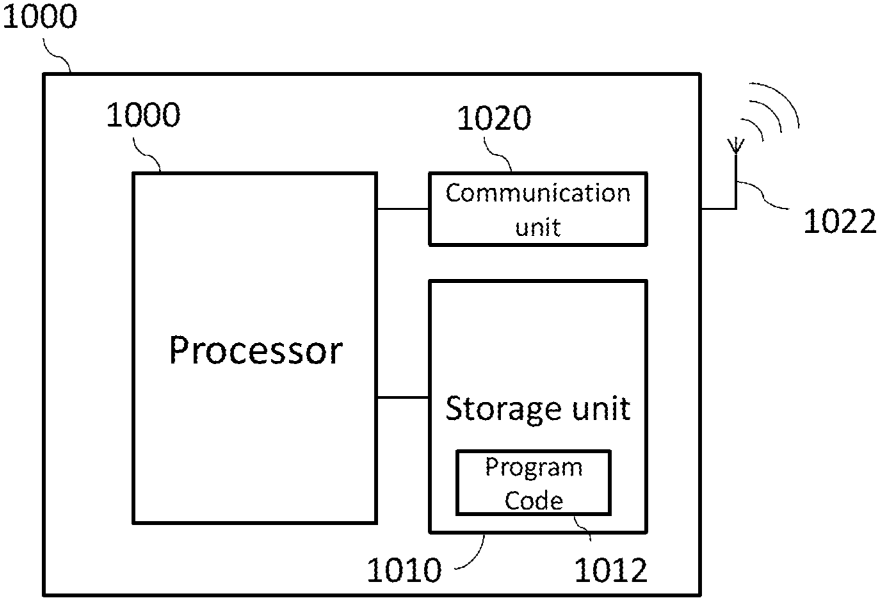
FIG. 10 shows an example of a schematic diagram of a wireless terminal according to an embodiment of the present disclosure.

FIG. 10 relates to a schematic diagram of a wireless terminal 100 according to an embodiment of the present disclosure. The wireless terminal 100 may be a user equipment (UE), a mobile phone, a laptop, a tablet computer, an electronic book or a portable computer system and is not limited herein. The wireless terminal 100 may include a processor 1000 such as a microprocessor or Application Specific Integrated Circuit (ASIC), a storage unit 1010 and a communication unit 1020. The storage unit 1010 may be any data storage device that stores a program code 1012, which is accessed and executed by the processor 1000. Embodiments of the storage unit 1012 include but are not limited to a subscriber identity module (SIM), read-only memory (ROM), flash memory, random-access memory (RAM), hard-disk, and optical data storage device. The communication unit 1020 may a transceiver and is used to transmit and receive signals (e.g., messages or packets) according to processing results of the processor 1000. In an embodiment, the communication unit 1020 transmits and receives the signals via at least one antenna 1022 shown in FIG. 10.

In an embodiment, the storage unit 1010 and the program code 1012 may be omitted and the processor 1000 may include a storage unit with stored program code.

The processor 1000 may implement any one of the steps in exemplified embodiments on the wireless terminal 100, e.g., by executing the program code 1012.

The communication unit 1020 may be a transceiver. The communication unit 1020 may as an alternative or in addition be combining a transmitting unit and a receiving unit configured to transmit and to receive, respectively, signals to and from a wireless network node (e.g., a base station).

Figure 11:
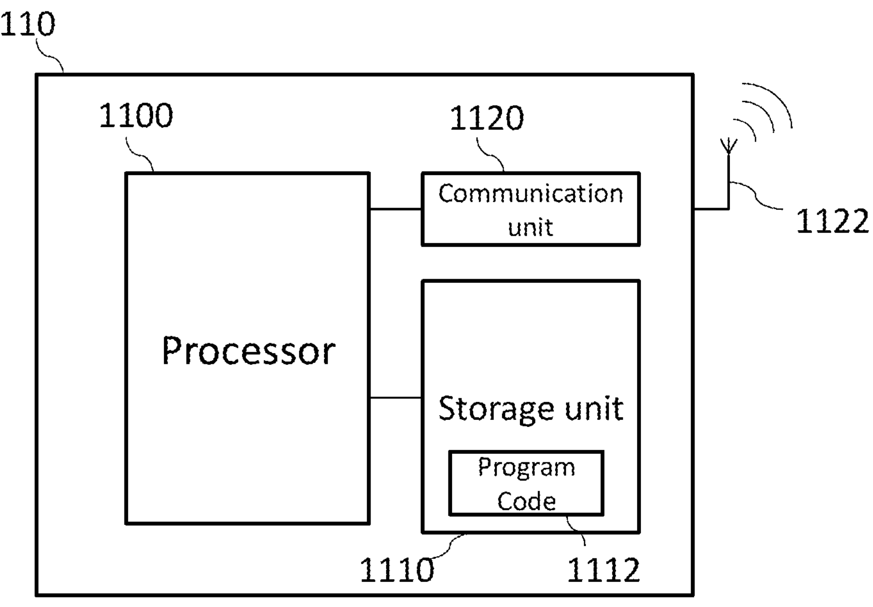
FIG. 11 shows an example of a schematic diagram of a wireless network node according to an embodiment of the present disclosure.

FIG. 11 relates to a schematic diagram of a wireless network node 110 according to an embodiment of the present disclosure. The wireless network node 110 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 110 may comprise (perform) at least one network function such as an access and mobility management function (AMF), a session management function (SMF), a user place function (UPF), a policy control function (PCF), an application function (AF), etc. Note that, the wireless network node 110 may comprise (e.g., perform any functionality of) the network entity and/or network function shown in FIG. 3. For example, the wireless network node 110 may be the PGW-C+SMF. The wireless network node 110 may include a processor 1100 such as a microprocessor or ASIC, a storage unit 1110 and a communication unit 1120. The storage unit 1110 may be any data storage device that stores a program code 1112, which is accessed and executed by the processor 1100. Examples of the storage unit 1112 include but are not limited to a SIM, ROM, flash memory, RAM, hard-disk, and optical data storage device. The communication unit 1120 may be a transceiver and is used to transmit and receive signals (e.g., messages or packets) according to processing results of the processor 1100. In an example, the communication unit 1120 transmits and receives the signals via at least one antenna 1122 shown in FIG. 11.

In an embodiment, the storage unit 1110 and the program code 1112 may be omitted. The processor 1100 may include a storage unit with stored program code.

The processor 1100 may implement any steps described in exemplified embodiments on the wireless network node 110, e.g., via executing the program code 1112.

The communication unit 1120 may be a transceiver. The communication unit 1120 may as an alternative or in addition be combining a transmitting unit and a receiving unit configured to transmit and to receive, respectively, signals to and from a wireless terminal (e.g., a user equipment).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations but, can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein but is to be accorded the widest scope consistent with the novel features and principles disclosed herein, as recited in the claims below.

We claim:

1. A wireless communication method for use in a network entity, the method comprising:

receiving, from a wireless terminal registered in a first network and that has established a protocol data unit (PDU) session in the first network, an indicator associated with a capability of supporting at least one method of interacting with an external network for a packet data connection authentication and/or authorization of the external network, transmitting, to the wireless terminal, an extensible authentication protocol (EAP) authentication request, and performing a procedure based on the EAP authentication request, wherein the procedure is associated with performing handover of the protocol data unit (PDU) session of the wireless terminal from the first network to a second network as the packet data network connectivity, wherein the first network is associated with a 5G system and the second network is associated with an evolved packet system.

2. The wireless communication method of claim 1, wherein the at least one method comprises at least one of: an EAP.

3. The wireless communication method of claim 1, wherein the network entity is associated with the second network, and wherein the indicator is received in a create session request message.

4. A wireless communication method for use in a wireless terminal, the method comprising:

registering in a first network and establishing a protocol data unit (PDU) session in the first network before transmitting an indicator to a network entity, transmitting, to the network entity, the indicator associated with a capability of supporting at least one method of interacting with an external network for a packet data connection authentication and/or authorization of the external network, receiving, from the network entity, an extensible authentication protocol (EAP) authentication request, and performing a procedure based on the EAP authentication request, wherein the procedure is associated with performing handover of the protocol data unit (PDU) session of the wireless terminal from the first network to a second network as the packet data network connectivity, wherein the first network is associated with a 5G system and the second network is associated with an evolved packet system.

5. The wireless communication method of claim 4, wherein the at least one method comprises an EAP.

6. The wireless communication method of claim 4, wherein the network entity is associated with the second network, and wherein the indicator is transmitted in an Attach Request message or a PDN connectivity request message.

7. A network entity, comprising a processor and a storage unit, wherein the processor is configured to read a program code from the storage unit and perform:

receiving, from a wireless terminal registered in a first network and that has established a protocol data unit (PDU) session in the first network, an indicator associated with a capability of supporting at least one method of interacting with an external network for a packet data connection authentication and/or authorization of the external network, transmitting, to the wireless terminal, an extensible authentication protocol (EAP) authentication request, and performing a procedure based on the EAP authentication request, wherein the procedure is associated with performing handover of the protocol data unit (PDU) session of the wireless terminal from the first network to a second network as the packet data network connectivity, wherein the first network is associated with a 5G system and the second network is associated with an evolved packet system.

8. The network entity of claim 7, wherein the at least one method comprises at least one of:

an EAP.

9. The network entity of claim 7, wherein the network entity is associated with the second network, and wherein the indicator is received in a create session request message.

10. A wireless terminal, comprising a processor and a storage unit, wherein the processor is configured to read a program code from the storage unit and perform:

registering in a first network and establishing a protocol data unit (PDU) session in the first network before transmitting an indicator to a network entity, transmitting, to the network entity, the indicator associated with a capability of supporting at least one method of interacting with an external network for a packet data connection authentication and/or authorization of the external network, receiving, from the network entity, an extensible authentication protocol (EAP) authentication request, and performing a procedure based on the EAP authentication request, wherein the procedure is associated with performing handover of the protocol data unit (PDU) session of the wireless terminal from the first network to a second network as the packet data network connectivity, wherein the first network is associated with a 5G system and the second network is associated with an evolved packet system.

11. The wireless terminal of claim 10, wherein the at least one method comprises an extensible authentication protocol EAP.

12. The wireless terminal of claim 10, wherein the network entity is associated with the second network, and wherein the indicator is transmitted in an Attach Request message or a PDN connectivity request message.

* * * * *